US006868191B2

(12) United States Patent
Nister

(10) Patent No.: US 6,868,191 B2
(45) Date of Patent: Mar. 15, 2005

(54) SYSTEM AND METHOD FOR MEDIAN FUSION OF DEPTH MAPS

(75) Inventor: David Nister, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 618 days.

(21) Appl. No.: 09/891,238

(22) Filed: Jun. 27, 2001

(65) Prior Publication Data

US 2002/0015048 A1 Feb. 7, 2002

Related U.S. Application Data

(60) Provisional application No. 60/214,791, filed on Jun. 28, 2000.

(51) Int. Cl.[7] .............................................. G06T 15/00
(52) U.S. Cl. ...................... 382/285; 345/419; 345/422; 345/606; 345/632
(58) Field of Search ................... 382/285; 345/419–634

(56) References Cited

U.S. PATENT DOCUMENTS

| 6,046,763 | A | | 4/2000 | Roy ............................. 348/47 |
| 6,052,124 | A | | 4/2000 | Stein et al. ................. 345/419 |
| 6,084,979 | A | * | 7/2000 | Kanade et al. .............. 382/154 |
| 6,252,974 | B1 | * | 6/2001 | Martens et al. ............. 382/107 |
| 6,266,064 | B1 | * | 7/2001 | Snyder ........................ 345/421 |
| 6,314,211 | B1 | * | 11/2001 | Kim et al. ................... 382/285 |
| 6,504,569 | B1 | * | 1/2003 | Jasinschi et al. ............. 348/43 |
| 6,633,664 | B1 | * | 10/2003 | Minamida et al. .......... 382/154 |

FOREIGN PATENT DOCUMENTS

| EP | 0871144 | 10/1998 | ............. G06T/7/00 |
| WO | WO9906956 | 2/1999 | ........... G06T/15/10 |
| WO | WO0122366 | 3/2001 | ............. G06T/7/20 |

OTHER PUBLICATIONS

Tirumalai et al., Dynamic Stereo with Self–Calibration, Dec. 1992, IEEE Transactions on Pattern Analysis and Machine Intelligence, vol. 14, Issue 12, pp. 466–470.*

Y. Boykov, et al., "Fast approximate energy minimization via graph cuts", ICCV 99, pp. 377–384.

P. Eisert et al., "Automatic reconstruction of 3–D stationary objects from multiple uncalibrated camera views", IEEE Transactions on Circuits and Systems for Video Technology, 10(2), pp. 261–277, Mar. 2000.

P. Fua, "Reconstructing complex surfaces from multiple stereo views", Proc, ICCV 95, pp. 1078–1985.

R. Mandelbaum, et al., "Correlation–based estimation of ego–motion and structure from motion and stereo", ICCV 99, pp. 544–550.

(List continued on next page.)

*Primary Examiner*—Leo Boudreau
*Assistant Examiner*—Dennis Rosario-Vasquez

(57) ABSTRACT

The present invention is directed toward providing a system for constructing a graphical representation of an image, as perceived from a desired view, from a plurality of calibrated views. An optimum, median fused depth map of a new, desired view of an object or a scene is constructed from a plurality of depth maps of the object or scene, utilizing median values for each of the image pixels within the image domain of the new view. Each of the known depth maps are rendered into the new view, and the pixels of the rendered image are processed one at a time until a median value for each pixel in the new view of the image of the object or scene is calculated. The calculated median values are then assembled into a median fused depth map of the new view of the object or scene, with the median fused depth map available to construct a new two or three dimension images and models of the object or scene as perceived from the new view.

14 Claims, 5 Drawing Sheets

OTHER PUBLICATIONS

L. Robert et al., "Dense depth map reconstruction: A minimization and regularization approach which preserves discontinuities", ECCV 96, pp. 439–451.

H. Saito, et al., "Shape reconstruction in projective grid space from large number of images", IEEE Computer Society Conference on Computer Vision and Pattern Recognition (CVPR 99), Fort Collins, CO, Jun. 1999.

S. Birchfield et al., Multiway Cut for Stereo and Motion With Slated Surfaces, ICCV 99, pp. 489–496. (date unknown).

A. Fitzgibbon et al., Automatic Camera Recovery for Closed or Open Image Sequences, Proc. ECCV 98, pp. 311–326, (date unknown).

P. Beardsley et al., Sequential Updating of Projective and Affine Structure from Motion, IJCV, 23(3), pp. 235–259, 1997.

R. Cipolla et al., 3D Model Acquisition from Uncalibrated Images, Proc. IAPR Workshop on Machine Vision Applications, Chiba Japan, pp. 559–568, Nov. 1998.

P. Debevec, Modeling and Rendering Architecture from Photographs: A hybrid Geometry–and Image–based Approach, Siggraph 96, pp. 11–20, Computer Graphics Proceedings, Annual Conference Series, 1996.

O. Faugeras et al., Variational Principles, Surface Evolution, PDE's Level Set Methods and the Stereo Problem, IEEE Transactions on Image Processing, 7(3), pp. 336–344, Mar. 1998.

O. Faugeras, What Can Be Seen in Three Dimensions With an Uncalibrated Stereo Rig?, Proc. ECCV 92, pp. 563–578. (date unknown.

L. Gaucher, et al., Accurate Motion Flow Estimation with Discontinuities, ICCV 99, pp. 695–702. (date unknown).

D. Greig et al., Exact Maxium A Posteriori Estimation for Binary Images, Journal of the Royal Statistical Society, Series B, 51(2), pp. 271–279, 1989.

K. Hanna et al., Combining Stereo and Motion for Direct Estimation of Scene Structure, Proc. ICCV 93, pp. 357–365, 1993.

R. Hartley, Euclidean Reconstruction from Uncalibrated Views, Application of Invariance in Computer Vision, LNCS 825, pp. 237–256, Springer–Verlag, 1994.

A. Heyden et al., Euclidean Reconstruction from Image Sequences with Varying and Unknown Focal Length and Principal Point, Proc. CVPR 97, pp. 438–443, 1997.

K. Kutulakos et al., A Theory of Shape by Space Carving, Proc ICCV 99, pp. 307–314. (date unknown).

S. Maybank et al., A Theory of Self–Calibration of a Moving Camera, International Journal of Computer Vision, 8(2), pp. 123–151, 1992.

D. Nister, Frame Decimation for Structure and Motion, Accepted to SMILE 2000.

D. Nister, Reconstruction from Uncalibrated Sequences with a Hierarchy of Trifocal Tensors, Accepted to ECCV 2000.

M. Pollefeys et al., Self–Calibration and Metric Reconstruction In spite of Varying and Unknown Internal Camera Parameters, IJCV, 32(1), pp. 7–26, Aug. 1999.

P. Torr et al., An Integrated Bayesian Approach to Layer Extraction from Image Sequences, ICCV 99, pp. 983–990. (date unknown).

L. Van Gool et al., Automatic 3D Model Building from Video Sequences, Proc. ECMAST 96, vol. 8., No. 4, pp. 563–582, 1997.

Ahuja, et al., Network Flows: theory, algorithms and applications. ISBN 0–136–17549–X, Prentice Hall, pp. 207–249, 1993.

European Search Report Application No.: RS 105653, mailed Jan. 17, 2002.

International Search Report Application No.: PCT/SEO1/01494, mailed Jan. 3, 2002.

Narayanan P J et al., "Constructing virtual worlds using dense stereo" pp. 3–10, XP000874141, Jan. 1998.

Park J—I et al., Arbitrary view generation form multiple cameras pp. 149–152, vol. 1, XP000792737, 1997.

Saito H et al., "Appearance–based virtual view generation of temporally–varying events from multi–camera images in the 3D room" pp. 516–525, XP002157613, Oct. 1999.

* cited by examiner

SYSTEM AND METHOD FOR MEDIAN FUSION OF DEPTH MAPS

CROSS-REFERENCE TO RELATED APPLICATION

This application is based upon and claims priority from U.S. provisional application No. 60/214,791, filed Jun. 28, 2000, the contents being incorporated herein by reference.

BACKGROUND OF THE INVENTION

1. Field of the Invention

The present invention relates generally to systems for creating graphical models from video sequences, and more particularly, to a system for constructing a refined graphical representation of an image from a plurality of calibrated camera views.

2. Background Information

Computer-aided imagery is the process of rendering new two-dimension and three-dimension images on a terminal screen or graphical user interface from two or more digitized two-dimension images with the assistance of the processing and data handling capabilities of a computer. Constructing a three-dimension (hereinafter "3D") model from two-dimension (hereinafter "2D") images is utilized, for example, in computer-aided design (hereinafter "CAD"), 3D teleshopping, and virtual reality systems, in which the goal of the processing is a graphical 3D model of an object or a scene that was originally represented only by a finite number of 2D images. Under this application of computer graphics or computer vision, the 2D images from which the 3D model is constructed represent views of the object or scene as perceived from different views or locations around the object or scene. The images are obtained either from multiple cameras positioned around the object or scene or from a single camera in motion around the object, recording pictures or a video stream of images of the object. The information in the 2D images is combined and contrasted to produce a composite, computer-based graphical 3D model. While recent advances in computer processing power and data-handling capability have improved computerized 3D modeling, these graphical 3D construction systems remain characterized by demands for heavy computer processing power, large data storage requirements, and long processing times. Furthermore, volumetric representations of space, such as a graphical 3D model, are not easily amenable to dynamic modification, such as combining the 3D model with a second 3D model or perceiving the space from a new view or center of projection.

Typically the construction of a 3D image from multiple views or camera locations first requires camera calibration for the images produced by the cameras to be properly combined to render a reasonable 3D reconstruction of the object or scene represented by the images. Calibration of a camera or a camera location is the process of obtaining or calculating camera parameters at each location or view from which the images are gathered, with the parameters including such information as camera focal length, viewing angle, pose, and orientation. If the calibration information is not readily available, a number of calibration algorithms are available to calculate the calibration information. Alternatively, if calibration information is lacking, some graphical reconstruction methods estimate the calibration of camera positions as the camera or view is moved from one location to another. However, calibration estimation inserts an additional variable in the 3D graphical model rendering process that can cause inaccuracies in the output graphics. Furthermore, calibration of the camera views necessarily requires prior knowledge of the camera movement and/or orientation, which limits the views or images that are available to construct the 3D model by extrapolating the calibrated views to a new location.

One current method of reconstructing a graphical 3D model of an object from multiple views is by using pairs of views of the object at a time in a process known as stereo mapping, in which a correspondence between the two views is computed to produce a composite image of the object. However, shape information recovered from only two views of an object is neither complete nor very accurate, so it is often necessary to incorporate images from additional views to refine the shape of the 3D model. Additionally, the shape of the stereo mapped 3D model is often manipulated in some graphical systems by the weighting, warping, and/or blending of one or more of the images to adjust for known or perceived inaccuracies in the image or calibration data. However, such manipulation is a manual process, which not only limits the automated computation of composite graphical images but also risks introducing errors as the appropriate level of weighting, warping, and/or blending is estimated.

Recently, graphical images in the form of depth maps have been applied to stereo mapping to render new 2D views and 3D models of objects and scenes. A depth map is a two-dimension array of values for mathematically representing a surface in space, where the rows and columns of the array correspond to the x and y location information of the surface; and the array elements are depth or distance readings to the surface from a given point or camera location. A depth map can be viewed as a grey scale image of an object, with the depth information replacing the intensity information, or pixels, at each point on the surface of the object. Accordingly, surface points are also referred to as pixels within the technology of 3D graphical construction, and the two terms will be used interchangeably within this disclosure.

A graphical representation of an object can be estimated by a depth map under stereo mapping, using a pair of views at a time. Stereo depth mapping typically compares sections of the two depth maps at a time, attempting to find a match between the sections so as to find common depth values for pixels in the two maps. However, since the estimated depth maps invariably contain errors, there is no guarantee that the maps will be consistent with each other and will match where they should. While an abundance of data may be advantageous to minimize the effect of a single piece of bad or erroneous data, the same principle does not apply to depth maps where any number of depth maps may contain errors because of improper calibration, incorrect weighting, or speculations regarding the value of the particular view, with any errors in the depth maps being projected into the final composite graphical product. Furthermore, conventional practices of stereo mapping with depth maps stop the refinement process at the estimation of a single depth map.

The preferred embodiments of the present invention overcome the problems associated with existing systems for fusing a number of depth maps into a consistent and accurate representation of a three dimensional object or scene.

SUMMARY OF THE INVENTION

The present invention is directed toward a system and method for computing a refined depth map for a spatial representation from a plurality of estimated depth maps. The system utilizes information in multiple depth maps of a represented image to refine an optimum depth map, selecting the median depth value for each pixel in each depth map rendered into a new view. The system determines the median depth map value for each pixel by selecting the rendered pixel depth value that is the median value among all the respective pixels from the rendered depth maps, which are fused one at a time with the new view of the object or scene. The resulting median fused depth map can be used to more accurately represent a graphical or video image as perceived from the new view.

In accordance with one aspect of the present invention, a system and method is directed toward computing a fused depth map of a view of an object, including obtaining camera calibration data for a new view of an object; rendering each of a plurality of known depth maps of the object into the new view of the object based on the camera calibration of the new view; and computing the depth map elements of a fused depth map of the new view of the object, wherein each said depth map element corresponds to a pixel in the new view of the object and wherein each said depth map element comprises a median value of a set of rendered depth map elements, corresponding to the pixel, each from one of the plurality of rendered depth maps.

In accordance with another aspect of the invention, a system and method is directed toward constructing a graphical representation of an object, as perceived from a desired view, from a plurality of calibrated views, including obtaining camera calibration data for a desired view of the object; computing a plurality of depth maps, each depth map respectively corresponding to each of a plurality of calibrated views of the object; for each of the plurality of computed depth maps, rendering a selected, computed depth map into the desired view; for each pixel in the desired view, computing a median fused depth map value at said pixel, wherein as many rendered depth maps occlude said pixel as pass it by; and projecting the graphical representation of the object as perceived from the desired view, utilizing the computed median fused depth map values.

BRIEF DESCRIPTION OF THE DRAWINGS

These and other objects and advantages of the present invention will become more apparent and more readily appreciated to those skilled in the art upon reading the following detailed description of the preferred embodiments, taken in conjunction with the accompanying drawings, wherein like reference numerals have been used to designate like elements, and wherein:

FIG. 1 shows a depth map of view i, wherein a point, x, is located on the target surface in view a;

FIG. 2 shows a depth map of view i, wherein a point, x, is occluded in view a;

FIG. 3 shows a depth map of view i, wherein a point, x, is passed in view a;

DETAILED DESCRIPTION OF THE PREFERRED EMBODIMENTS

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 1:
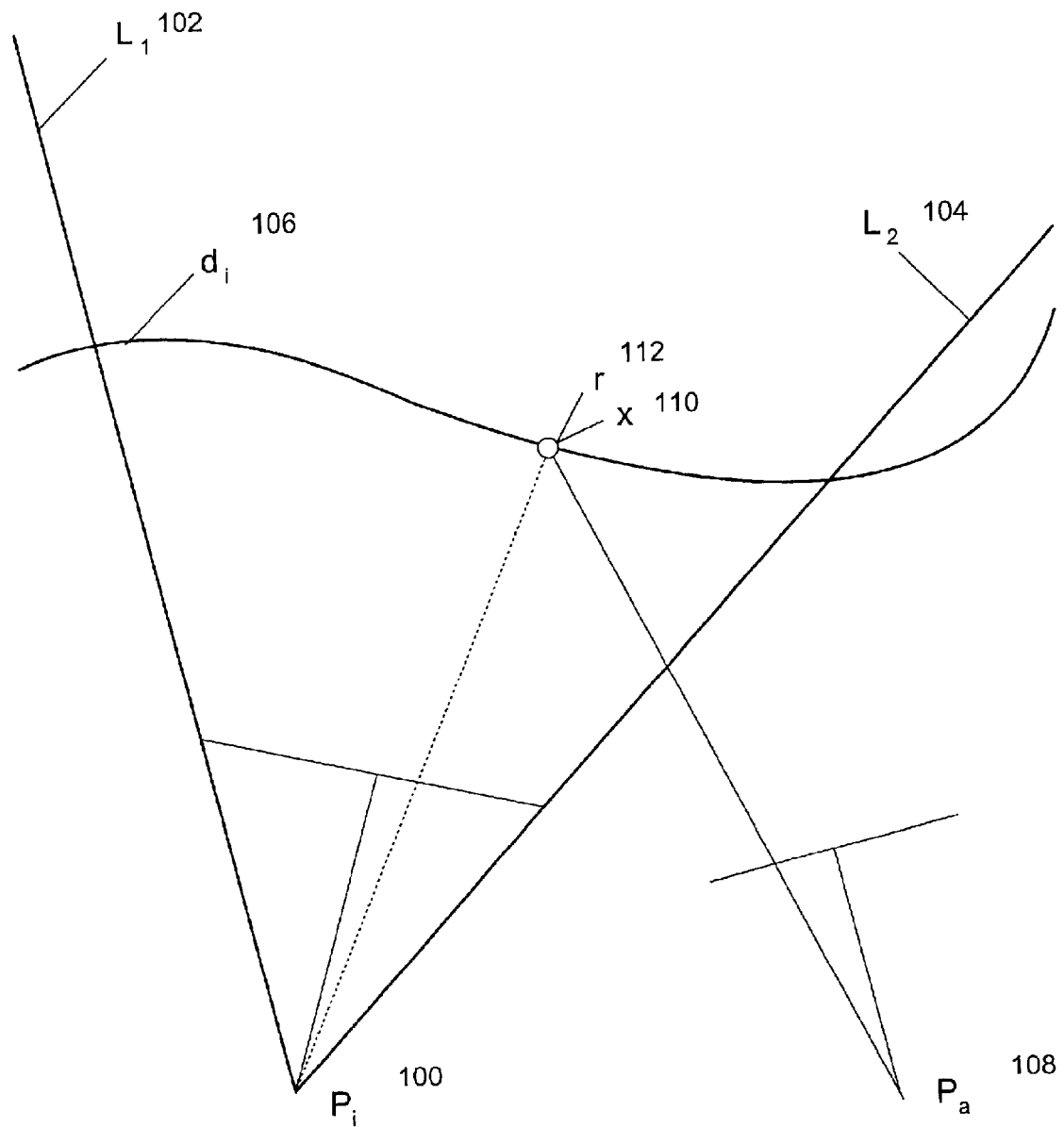

While the present invention can be utilized for determining fused depth maps of virtually any object or scene and for constructing 3D images of such objects and scenes, the discussion below will refer to all such 3D items as "objects" to simplify the explanation of the embodiments of the invention. Referring now initially to FIG. 1, there is shown a portion of an object as perceived from view i. The line segment, $d_i$ 106 represents the view of the object as seen from view i, in the image plane formed by lines $L_1$ 102 and $L_2$ 104, emanating from a center of projection (hereinafter "COP") of view i at $P_i$ 100. The view i represents one of a plurality of known views of the object, for which camera calibrations are known or can be calculated. View a represents a new, desired orientation from which to view the object and for which a preferred embodiment of the present inventive system computes a median fused depth map as an optimized depth map for the view a, given the known views and the camera calibration at $P_a$ 108, the COP for view a. While the invention is presently envisioned to be implemented on a personal or laptop computer, the method and apparatus of the present median depth map fusion system can function equally well on any number of computers or processors without detracting from the inventive features of the system.

In a preferred embodiment of the present invention for computing a median fused depth map of an object, a set of n calibrated views, $\{v_i\}_{i=1}^n$, of the object is first obtained by any one of several well known methods for capturing views of an object. While the invention is operable given a minimum of two views of the object, the resultant fused depth map will be a more accurate graphical rendition of the object if a greater number of views are utilized in the computation of the fused depth map.

For each view i (represented as $v_i$) of the object, there is an associated depth function $d_i$ defined on the domain of the image of the object. For each pixel x 110 in view i, the depth function has a depth map value of $d_i(x)$. The depth map value $d_i(x)$ is an estimate of the distance from the center of projection for view i to the closest point or pixel x along the back projected ray corresponding to the image point x in view i of the object. Referring to FIG. 1, the depth value $d_i(x)$ for pixel x 110 in view i is the distance from COP $P_i$ 100 to pixel x 110.

Figure 2:
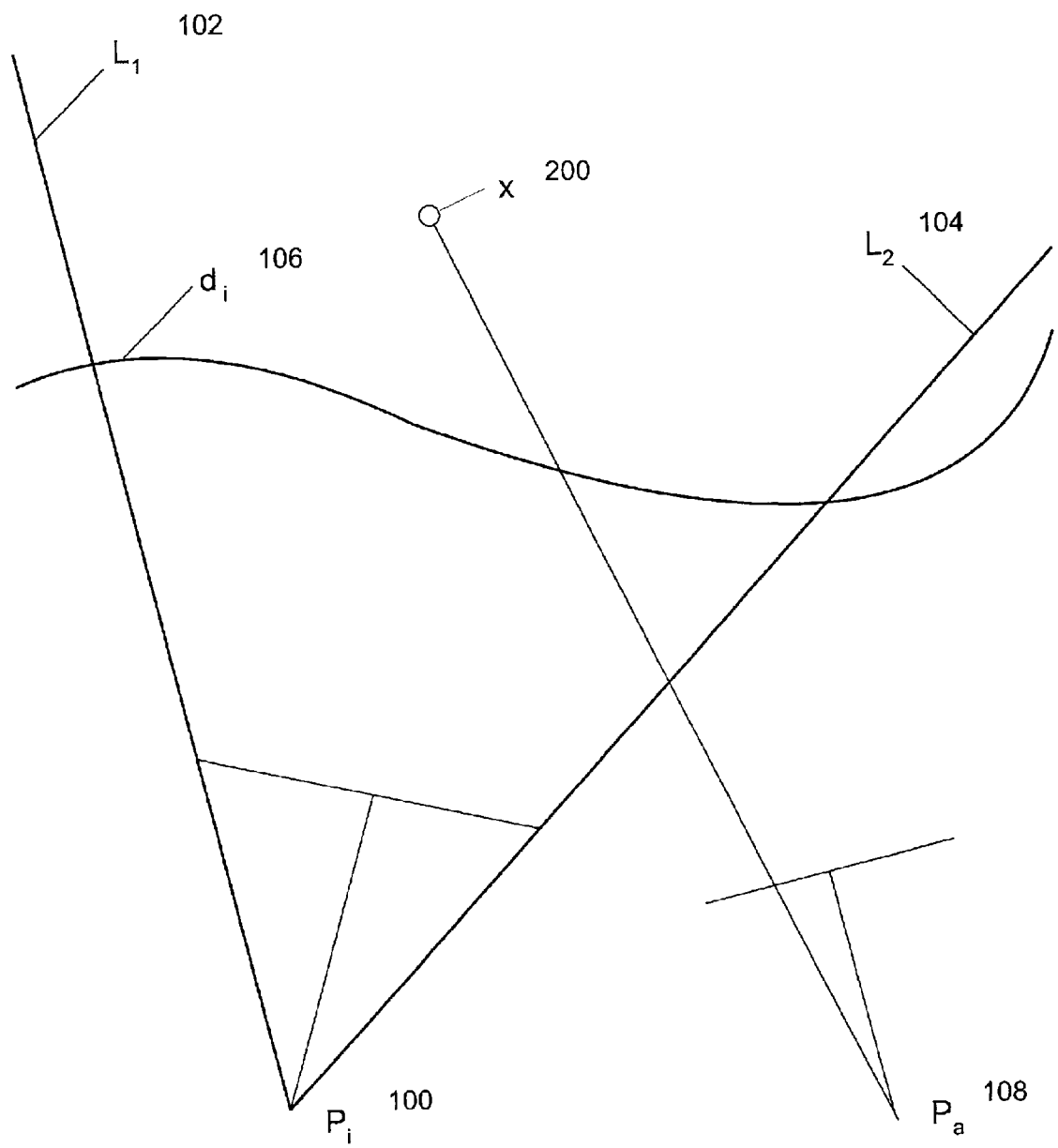
Figure 3:
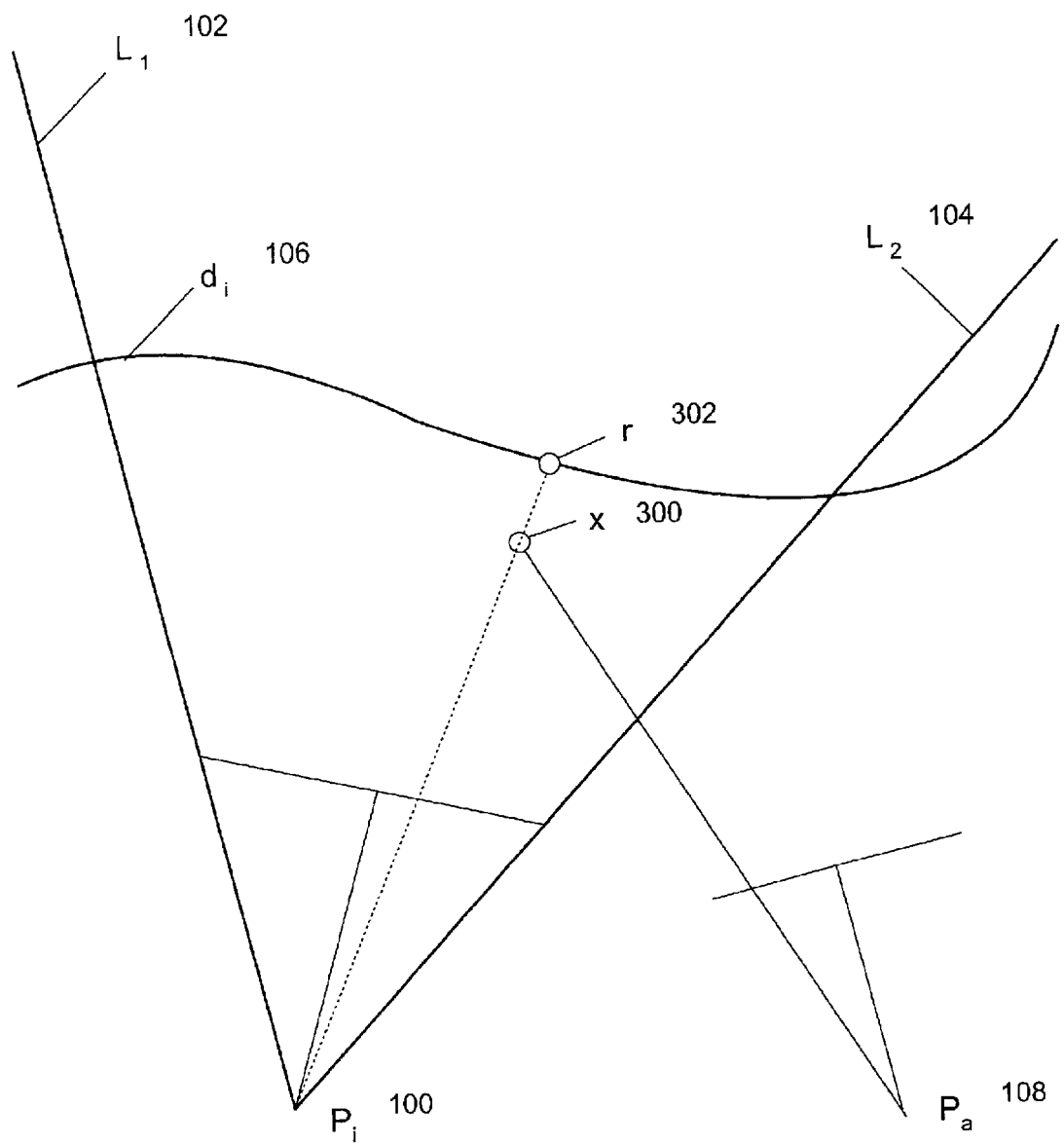

Referring now to FIGS. 1, 2, and 3, any pixel x 110, 200, or 300 in the image domain of the object is either on the surface $d_i$ as in FIG. 1, is located beyond the surface from $P_i$, as shown in FIG. 2, or is located "in front of" the surface, relative to $P_i$, as shown in FIG. 3. Points located beyond $d_i$ from $P_i$, as in FIG. 2, are said to be "occluded" by depth map $d_i$ in view a because $P_a$ cannot "see" point x 200 because of the surface $d_i$. Points located in front of $d_i$, as shown in FIG. 3, are said to be "passed" by depth map $d_i$ in view i. When viewed as a continuous function, the depth map $d_i$ defines a surface in space as perceived from view i, and as graphically represented by element $d_i$ 106 in the planar views of FIGS. 1, 2, and 3.

The present invention utilizes a variation of the mathematical principle of median values to compute an optimum depth map, $f_a$, of a new, desired view a from a plurality of estimated depth maps $\{d_i\}_{i=1}^n$ corresponding to known views $\{v_i\}_{i=1}^n$ of the object.

This optimum depth map, as computed by embodiments of the present invention, is termed a "median fused depth map" because of the process described below of fusing a plurality of depth maps such that a median depth value is determined for each pixel $x_a$ 110 on the surface of the object in the new view a. The median fused depth map value of a pixel $x_a$ in new view a is defined to be "stable for view a" when, in the set of known depth maps $\{d_i\}_{i=1}^n$ for the object, there are at least as many depth maps that occlude $x_a$ 200 in view a as there are depth maps that pass $x_a$ 300 in view a. Therefore, the process of the present invention is determining an optimum depth value for each pixel $x_a$ 110 in the new view a such that there are at least as many known depth maps $d_i$ that occlude $x_a$ 200 in view a as there are depth maps $d_i$ that pass $x_a$ 300 in view a. The optimum, or median fused depth value, $f_a(x_a)$, for each pixel $x_a$ 110 in view a is the infimum, or greatest lower value, of all depth values $d_i(x)$ such that all pixels $\{x_a\}_{a=1}^s$ 110 are stable for view a.

Figure 4:
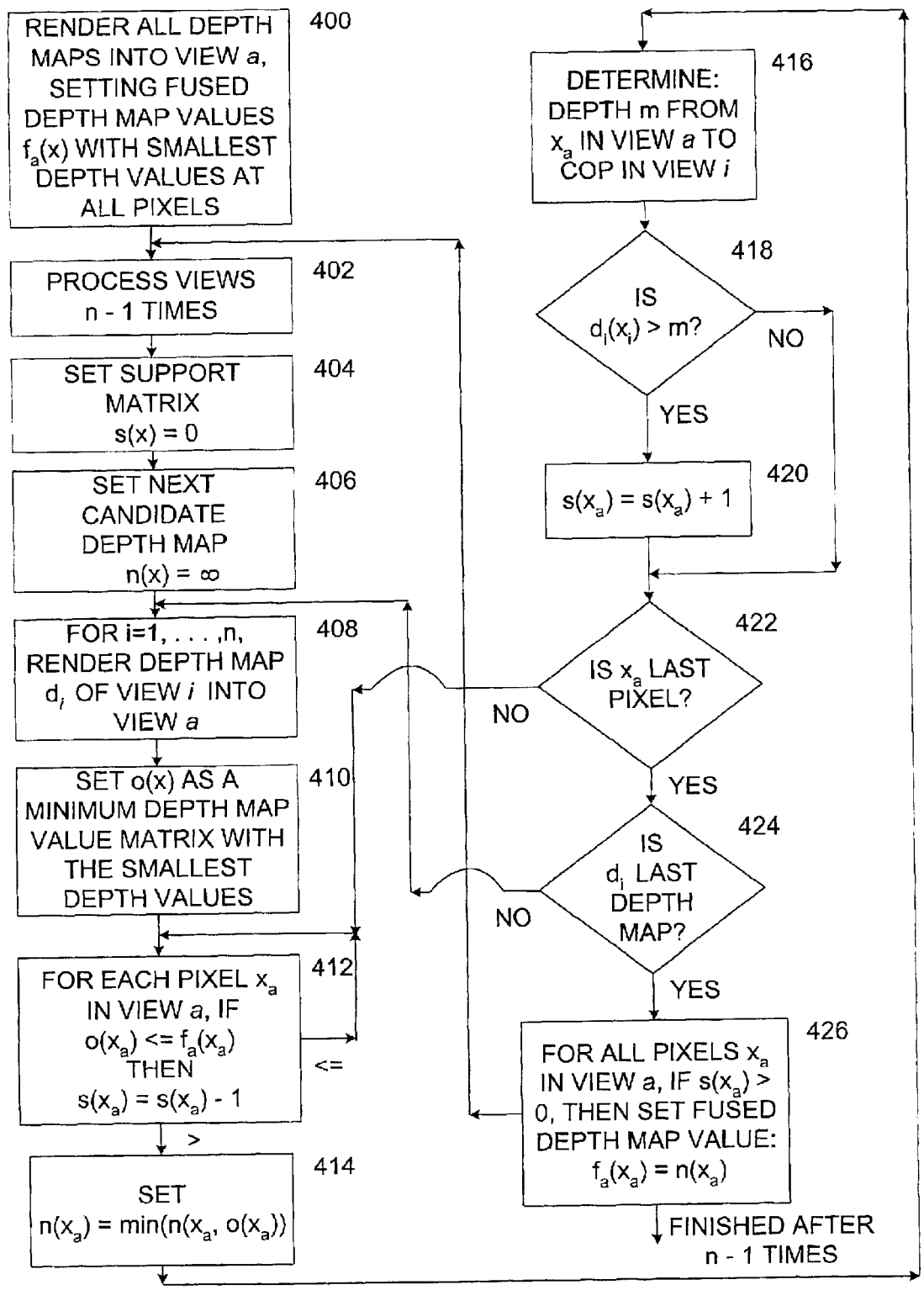
FIG. 4 shows a block flow chart of an exemplary method for constructing a median fused depth map of a view.

Prior to explaining the computation of a median fused depth map by a preferred embodiment of the present invention, definitions of several working elements of the system will be presented. The median fused depth map of view a as computed by the system is represented as $f_a$, with the median fused depth map value for a pixel x in view a is represented as $f_a(x)$. Referring to the flow chart of FIG. 4, one of the first steps of the median depth map fusion process, as discussed below regarding step 400, is to establish an estimated lowest value for $f_a$. Three two-dimension arrays are utilized to hold working values of minimum rendered depth map values, occlusion indicators, and fused depth values during the processing of all the depth maps $\{d_i\}_{i=1}^n$. A minimum depth map value matrix $o(x_a)$ is utilized to hold the minimum depth map values for the pixels, $x_a$, of view a. As each new depth map, $d_i$, i=1, . . . , n, is rendered into view a, the smallest of the depth map values for pixel $x_a$ of depth map $d_i$ as rendered into view a is stored as $o(x_a)$. As each subsequent depth map, $d_i$, i=1, . . . , n, is rendered into view a, the values or elements of the minimum depth map value matrix $o(x_a)$ are reset. A support matrix, $s(x_a)$, defined on the image domain of view a, holds the number of "votes" regarding whether any target pixel $x_a$ in view a is passed by or occluded by the various depth maps $\{d_i\}_{i=1}^n$. $s(x_a)$ is termed a support matrix in that a positive value in $s(x_a)$ represents support for a higher depth map value at pixel $x_a$. That is, $x_a$ is being passed by the depth map $d_i$ in view a. $s(x_a)$ is set to zero at step 404 at the beginning of each iteration of the processing of the set of depth maps $\{d_i\}d_{i=1}^n$. During the computation of the median fused depth map, and for each pixel $x_a$ represented in view a, the support matrix value at $s(x_a)$ is subtracted by 1 if the depth map $d_i$ rendered into view a occludes point $x_a$. If the rendered depth map passes by $x_a$ in view a, the corresponding support matrix value $s(x_a)$ is incremented by one, as discussed below. A next candidate depth map $n(x_a)$ is the repository of the computed, median fused depth value for each pixel $x_a$ as the present invention processes through the set of depth maps $\{d_i\}^{i=1,n}$ and represents the next possible candidate for the depth map at each pixel $x_a$. The next candidate depth map values are initially set to be equal to $\infty$ at step 406.

The target median fused depth value, $f_a(x_a)$, for each pixel $x_a$ in view a is computed as follows. Given two or more depth maps $\{d_i\}_{i=1}^n$ of respective views $\{v_i\}_{i=1}^n$ and the camera calibration for a new view a, which is different from any of the views $\{v_i\}_{i=1}^n$, the present invention computes a median fused depth map $f_a$ of view a. Utilizing a median value concept, the present system first establishes an initial estimate of the depth map, $f_a$, by using the smallest candidate depth value for each pixel $x_a$ in view a as the initial depth map values for $f_a$. This is accomplished by rendering the entire set of depth maps, $\{d_i\}^{i=1,n}$, into view a at step 400, one at a time, using depth buffering. The smallest depth value $f_a(x_a)$ for each pixel $x_a$ across all the renderings is retained as the initial estimate of the depth map $f_a$.

Referring now to FIGS. 1–4, the method of processing a plurality of known depth maps $\{d_i\}_{i=1}^n$ to compute a median fused depth map for a new, desired view a begins with the rendering of each depth map $d_i$, of view i, into view a, one view at a time, at step 408. Prior to rendering each depth map $d_i$ into view a, the elements of the minimum depth map value matrix $o(x_a)$ are initialized to be equal to $\infty$ at step 406. After rendering depth map $d_i$ into view a, each of the pixels $x_a$ 110, 200, and 300 of view a are processed at step 410 by setting each element of $o(x_a)$ equal to the smallest of the depth map values for pixel $x_a$ 110, 200, and 300. Each pixel $x_a$ can have multiple depth map values, or distances, along a back-projected ray through the pixels to the center of projection of view a, $P_a$ 108, if the depth map is folded across the ray. By virtue of the initialization of $o(x)$, untouched pixels of view a retain a depth value of $\infty$ in $o(x_a)$.

For all pixels $x_a$ in view a, if the point $x_a$ 200 is occluded by the rendered depth map of $d_i$, as in FIG. 2, then the support matrix value for the point is decremented by one at step 412:

if $o(x_a) \leq f_a(x_a)$ then set $s(x_a)=s(x_a)-1$ [1]

Since point $x_a$ is occluded by, or is beyond the surface represented by $d_i$, by subtracting one from the support matrix value for the point, the system is registering a vote against a larger depth value for the targeted fused depth map at this point. If point $x_a$ 110 and 300 is not occluded by the rendered depth map of $d_i$, as in FIGS. 1 and 3, then, at step 414, the next candidate depth map value $n(x_a)$ is set to the minimum of the existing next candidate depth map value for the point $x_a$ 110 and 300 and the minimum depth map value matrix element from the rendering of view $d_i$ into view a:

set $n(x_a)=\min(n(x_a),o(x_a))$ [2]

After setting the next candidate depth map value $n(x_a)$, a ray is backprojected from the pixel $x_a$ 110 and 300 in view a in FIGS. 1 and 3 to the depth $f_a(x_a)$. The resulting pixel x 110 or 300 is projected into view i at step 416 to get the pixel r 112 or 302 in view i and the depth m from $P_i$ to x 110 or 300. If x 300 is properly inside the image domain and if $d_i(x_a)>m$, as tested at step 418 and as shown in FIG. 3, then $d_i$ passes by x 300, and the support matrix value for the pixel is incremented by one at step 420:

set $s(x_a)=s(x_a)+1$ [3]

Since pixel $x_a$ is passed by, or is in front of the surface represented by $d_i$, by adding one to the support matrix value for the pixel, the system is registering a vote in favor of a larger depth value for the targeted fused depth map at this pixel. If the pixel $x_a$ is found to be on the surface $d_i$, then the support matrix value for the pixel remains the same since no vote is necessary for a larger or smaller depth map value for the pixel, such as shown in FIG. 1.

At step 422, if the pixel, $x_a$ 110, 200, or 300 processed is not the last pixel to be processed in the current view i, processing continues at step 412 with the next pixel in the view a. Otherwise, at step 424, if $d_i$ is not the last depth map of the set $\{d_i\}_{i=1}^n$, processing continues at step 408 with the next depth map of the set. If the last pixel of the last depth map has been processed, the depth map values for the median fused depth map are set at step 426 by evaluating the value of the support matrix for each pixel $x_a$ 110, 200, and 300 in the domain of view a as follows:

For all pixels $x_a$ in view a, if $s(x_a)>0$ then set $f_a(x_a)=n(x_a)$ [4]

If the value of the support matrix at pixel $x_a$ is greater than zero, the net votes from the processing of the known depth maps rendered into view a indicate a larger depth value than the minimum depth value, the larger value having been computed into the next candidate depth map $n(x_a)$ for pixel $x_a$. If the value of the support matrix is less than or equal to zero, the net processing of the rendered depth maps has concluded a smaller depth map value for pixel $x_a$ is called for; and the initialized minimum value in $f_a(x_a)$ as computed at step 404 is retained. With an updated, refined set of values for the fused depth map $f_a$, processing of all the depth maps is reinitiated at step 402 until the full set of depth maps has been rendered into the new view a n−1 times, guaranteeing convergence with the processing of steps 408–426 $n^2$ times.

Figure 5:
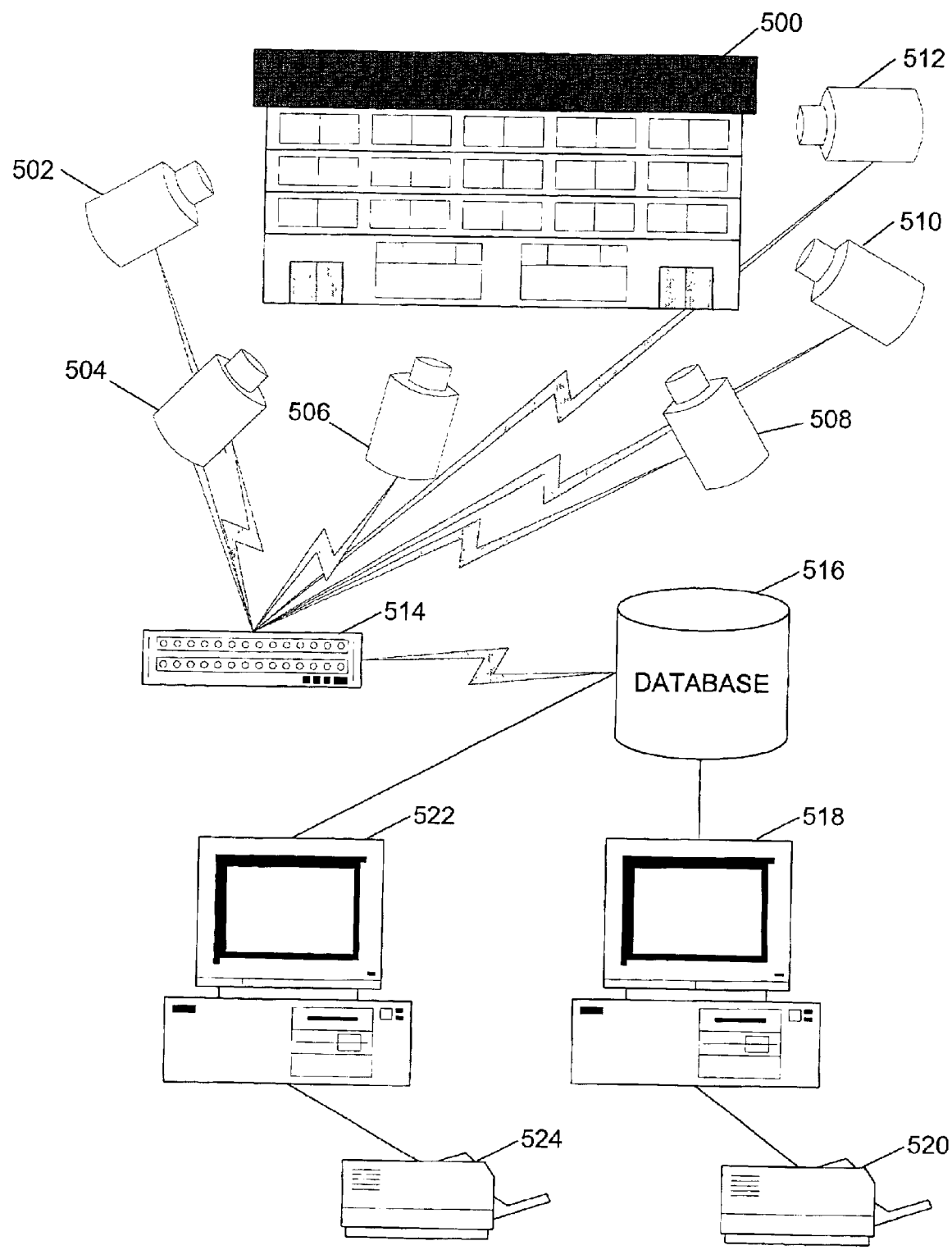
FIG. 5 illustrates the devices and communication links of an exemplary median depth map fusion system.

Referring now to FIG. 5, there are illustrated the devices and communication links of an exemplary median depth map fusion system in accordance with the present invention. The components of FIG. 5 are intended to be exemplary rather than limiting regarding the devices and communication pathways that can be utilized in the present inventive system. The building 500 represents the object or scene that can be the subject image of the views of the present invention, and cameras 502–510 represent the plurality of views or locations from which the object 500 can be perceived and for which depth maps are available. View 512 represents the new view for which the present inventive system can compute a median fused depth map, the calibration data associated with view 512 being known. The respective images captured from views 502–510 are transmitted or downloaded to a processor 514 for ultimate storage on database 516. The calibration information for views 502–512 can correspondingly be transmitted to processor 514, can be calculated by processor 518, and/or can be retrieved from database storage 516. The depth maps for views 502–510 are calculated or estimated by one of a plurality of known depth map calculation techniques and are stored on database 516. Alternatively, the processing functions of processor 514 and the storage functions of database 516 can be combined in a single device, such as a personal computer, as represented by processor 518; or can be distributed across multiple processors 514 and 518 and databases 516.

The actual computation of the median fused depth map is performed by processor 518, with data drawn from and stored onto database 516. In an alternative aspect of the invention, the storage provided by database 516 can be integrated into the processor 518. The various functional aspects of the present invention and the corresponding apparatus portions of the system for computing median fused depth maps, such as the initialization devices, selection devices, merging devices, and processors, can reside in a single processor 518 or can be distributed across a plurality of processors 518 and storage devices 516.

Once the median fused depth map is computed by processor 518 and stored on database 516, it can be accessed by any number of authorized users operating processors 522. These users can display a 2D or 3D representation of the median fused depth map on the screen or graphical user interface of the processor 522 and/or can print the same on the printer 524.

The communication and data links shown in FIG. 5 connecting the various apparatus components of the system can be either wireless or hard-wired links or any combination thereof. Similarly, the inventive system as illustrated in FIG. 5 can be implemented as a stand alone system or can be implemented across any known network or combination of networks, such as a local area network, a wide area network, an intranet, or the Internet, or any combination thereof, without detracting from the inventive features of the present median depth map fusion system.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method for computing a fused depth map of a view of an object, comprising:

obtaining camera calibration data for a new view of an object;

rendering each of a plurality of known depth maps of the object into the new view of the object based on the camera calibration of the new view; and computing the depth map elements of a fused depth map of the new view of the object, wherein each said depth map element corresponds to a pixel in the new view of the object and wherein each said depth map element comprises a median value of a set of rendered depth map elements, corresponding to the pixel, each from one of the plurality of rendered depth maps, said step of computing the depth map elements comprising;

for each pixel in the new view of the object, initializing the depth map element of the fused depth map of the new view corresponding to the pixel with the minimum value of the plurality of rendered depth map elements corresponding to the pixel;

initializing a support matrix to zero, wherein the support matrix is defined on the domain of the new view of the object;

initializing the elements of a next candidate depth map to infinity;

for each known depth map rendered into the new view of the object and for each pixel in the new view of the object, initializing a minimum depth map value matrix with the smallest depth map value for each said pixel;

decrementing the support matrix at the pixel by one if the pixel is occluded by the rendered depth map;

setting the element of the next candidate depth map at the pixel to the corresponding minimum depth map value matrix element if the pixel is not occluded by the rendered depth map and if the corresponding minimum depth map value matrix element corresponding to the pixel is less than the next candidate depth map element corresponding to the pixel;

incrementing the support matrix at the pixel by one if the pixel is passed by the rendered depth map; and for each pixel in the new view where the corresponding support matrix element is greater than zero, updating the fused depth map element of the new view with the corresponding next candidate depth map value.

2. A method for determining a fused depth map of a view of an object, comprising:

selecting a desired view of an object for which to determine a fused depth map;

selecting a plurality of known depth maps, wherein each selected known depth map includes at least a partial view of the object;

rendering the plurality of known depth maps into the desired view of the object, wherein for each pixel in the desired view, the corresponding fused depth map element of the desired view is initialized with the lowest depth map value among the plurality of rendered depth map elements corresponding to said pixel;

setting to zero the elements of a support matrix corresponding in dimension to the fused depth map;

setting to infinity the elements of a next candidate depth map corresponding in dimension to the fused depth map;

for each of the plurality of known depth maps, performing the following:
- rendering the known depth map into the desired view of the object; and
- for each pixel in the desired view, updating the corresponding element of the support matrix based on the value of the rendered depth map at each said pixel;

for each pixel in the desired view, performing the following:
- if the value of the support matrix at the pixel is greater than zero, then setting the fused depth map value at the pixel to be equal to the corresponding element of the next candidate depth map.

3. The method according to claim 2, wherein the step of updating the corresponding element of the support matrix comprises:
- initializing a minimum depth map value matrix element at said pixel with the smallest of the rendered depth map values at each said pixel;
- if the minimum depth map value matrix element at said pixel is less than or equal to the fused depth map value at the corresponding pixel, then decrementing the corresponding element of the support matrix by one; and
- if the minimum depth map value matrix element at said pixel is greater than the fused depth map value at the corresponding pixel, then updating the next candidate depth map and the support matrix element corresponding to said pixel.

4. The method according to claim 3, wherein the step of updating the next candidate depth map and the support matrix element comprises:
- setting the next candidate depth map at the pixel to the minimum of the next candidate depth map value and the minimum depth map value matrix element corresponding to the pixel; and
- if the pixel is passed by the rendered depth map, then incrementing the support matrix element corresponding to the pixel by one.

5. The method according to claim 2, wherein the steps beginning with the setting to zero the elements of a support matrix are repeated n−1 times, where n is the number of the plurality of known depth maps.

6. A method for determining a fused depth map of a view of an object, comprising:
- selecting a desired view of an object for which to determine a fused depth map;
- selecting a plurality of known depth maps, wherein each selected known depth map includes at least a partial view of the object;
- rendering the plurality of known depth maps into the desired view of the object, wherein for each pixel in the desired view, the corresponding fused depth map element of the desired view is initialized with the lowest depth map value among the plurality of rendered depth map elements corresponding to said pixel;
- setting to zero the elements of a support matrix corresponding in dimension to the fused depth map;
- setting to infinity the elements of a next candidate depth map corresponding in dimension to the fused depth map;
- for each of the plurality of known depth maps, performing the following:
  - rendering the known depth map into the desired view of the object; and
  - for each pixel in the desired view of the object, performing the following:
    - initializing a minimum depth map value matrix element at said pixel with the smallest of the rendered depth map values at each said pixel;
    - if the minimum depth map value matrix element at said pixel is less than or equal to the fused depth map value at the corresponding pixel, then decrementing the corresponding element of the support matrix by one; and
    - if the minimum depth map value matrix element at said pixel is greater than the fused depth map value at the corresponding pixel, then performing the following:
      - setting the next candidate depth map at the pixel to the minimum of the next candidate depth map value and the minimum depth map value matrix element corresponding to the pixel; and
      - if the pixel is passed by the rendered depth map, then incrementing the support matrix element corresponding to the pixel by one;
- for each pixel in the desired view, performing the following:
  - if the value of the support matrix at the pixel is greater than zero, then setting the fused depth map value at the pixel to be equal to the corresponding element of the next candidate depth map.

7. The method according to claim 6, wherein the steps of setting to zero the elements of a support matrix through the step of setting the fused depth map value at the pixel to be equal to the corresponding element of the next candidate depth map are repeated n−1 times, where n is the number of the plurality of known depth maps.

8. A system for computing a fused depth map of a view of an object, comprising:
- a measurement device obtaining camera calibration data for a new view of an object;
- a merging device rendering each of a plurality of known depth maps of the object into the new view of the object based on the camera calibration of the new view; and
- a processor computing the depth map elements of a fused depth map of the new view of the object, wherein each said depth map element corresponds to a pixel in the new view of the object and wherein each said depth map element comprises a median value of a set of rendered depth map elements, corresponding to the pixel, each from one of the plurality of rendered depth maps, said processor comprising:
- a first initialization device for each pixel in the new view of the object, initializing the depth map element of the fused depth map of the new view corresponding to the pixel with the minimum value of the plurality of rendered depth map elements corresponding to the pixel;
- a second initialization device initializing a support matrix to zero, wherein the support matrix is defined on the domain of the new view of the object;

a third initialization device initializing the elements of a next candidate depth map to infinity;

a fourth initialization device for each known depth map rendered into the new view of the object and for each pixel in the new view of the object, initializing a minimum depth map value matrix with the smallest depth map value for each said pixel;

a first math processor decrementing the support matrix at the pixel by one if the pixel is occluded by the rendered depth map;

an assignment device setting the element of the next candidate depth map at the pixel to the corresponding minimum depth map value matrix element if the pixel is not occluded by the rendered depth map and if the corresponding minimum depth map value matrix element corresponding to the pixel is less than the next candidate depth map element corresponding to the pixel;

a second math processor incrementing the support matrix at the pixel by one if the pixel is passed by the rendered depth map; and an update device for each pixel in the new view where the corresponding support matrix element is greater than zero, updating the fused depth map element of the new view with the corresponding next candidate depth map value.

9. A system for determining a fused depth map of a view of an object, comprising:

a first selection device selecting a desired view of an object for which to determine a fused depth map;

a second selection device selecting a plurality of known depth maps, wherein each selected known depth map includes at least a partial view of the object;

a first merging device rendering the plurality of known depth maps into the desired view of the object, wherein for each pixel in the desired view, the corresponding fused depth map element of the desired view is initialized with the lowest depth map value among the plurality of rendered depth map elements corresponding to said pixel;

a first initialization device setting to zero the elements of a support matrix corresponding in dimension to the fused depth map;

a second initialization device setting to infinity the elements of a next candidate depth map corresponding in dimension to the fused depth map;

a first processor comprising the following for each of the plurality of known depth maps:
 a second merging device rendering the known depth map into the desired view of the object; and
 a second processor updating, for each pixel in the desired view, the element of the support matrix corresponding to each said pixel, based on the value of the rendered depth map at each said pixel;
 an update device setting, for each pixel in the desired view, the fused depth map value at the pixel to be equal to the corresponding element of the next candidate depth map if the value of the support matrix at the pixel is greater than zero.

10. The system according to claim 9, wherein the second processor comprises:

a third initialization device initializing a minimum depth map value matrix element at said pixel with the smallest of the rendered depth map values at each said pixel;

a first math processor decrementing the corresponding element of the support matrix by one if the minimum depth map value matrix element at said pixel is less than or equal to the fused depth map value at the corresponding pixel; and a third processor updating the next candidate depth map and the support matrix element corresponding to said pixel if the minimum depth map value matrix element at said pixel is greater than the fused depth map value at the corresponding pixel.

11. The system according to claim 10, wherein the processor comprises:

an assignment device setting the next candidate depth map at the pixel to the minimum of the next candidate depth map value and the minimum depth map value matrix element corresponding to the pixel; and a second math processor incrementing the support matrix element corresponding to the pixel by one if the pixel is passed by the rendered depth map.

12. The system according to claim 9, wherein the first initialization device, the second initialization device, the first processor, and the update device perform their functions n−1 times, where n is the number of the plurality of known depth maps.

13. A system for determining a fused depth map of a view of an object, comprising:

a first selection device selecting a desired view of an object for which to determine a fused depth map;

a second selection device selecting a plurality of known depth maps, wherein each selected known depth map includes at least a partial view of the object;

a first merging device rendering the plurality of known depth maps into the desired view of the object, wherein for each pixel in the desired view, the corresponding fused depth map element of the desired view is initialized with the lowest depth map value among the plurality of rendered depth map elements corresponding to said pixel;

a first initialization device setting to zero the elements of a support matrix corresponding in dimension to the fused depth map;

a second initialization device setting to infinity the elements of a next candidate depth map corresponding in dimension to the fused depth map;

a first processor comprising the following for each of the plurality of known depth maps:
 a second merging device rendering the known depth map into the desired view of the object; and
 a second processor comprising the following for each pixel in the desired view of the object:
  a third initialization device initializing a minimum depth map value matrix element at said pixel with the smallest of the rendered depth map values at each said pixel;
  a first math processor decrementing the corresponding element of the support matrix by one if the minimum depth map value matrix element at said pixel is less than or equal to the fused depth map value at the corresponding pixel; and
  a third processor comprising the following if the minimum depth map value matrix element at said pixel is greater than the fused depth map value at the corresponding pixel:
   an assignment device setting the next candidate depth map at the pixel to the minimum of the next candidate depth map value and the minimum depth map value matrix element corresponding to the pixel; and a second math processor incrementing the support matrix element corresponding to the pixel by one if the pixel is passed by the rendered depth map;

a fourth processor comprising the following for each pixel in the desired view:

an update device setting the fused depth map value at said pixel to be equal to the corresponding element of the next candidate depth map if the value of the support matrix at said the pixel is greater than zero.

14. The system according to claim 13, wherein the respective functions of the first initialization device through the update device are repeated n−1 times, where n is the number of the plurality of known depth maps.

* * * * *